United States Patent [19]

Moore

[11] Patent Number: 4,613,000

[45] Date of Patent: Sep. 23, 1986

[54] APPARATUS FOR FASTENING MISALIGNED STRUCTURAL MEMBERS

[76] Inventor: Raymond J. Moore, 533 Wayland Ct., Claremont, Calif. 91711

[21] Appl. No.: 312,505

[22] Filed: Oct. 19, 1981

Related U.S. Application Data

[63] Continuation-in-part of Ser. No. 88,612, Oct. 26, 1979, Pat. No. 4,309,123.

[51] Int. Cl.$^4$ ............................................. B23Q 5/00
[52] U.S. Cl. ................................... 173/163; 173/13; 81/57.11; 81/429
[58] Field of Search ............... 173/13, 163; 408/127, 408/132, 75, 84; 279/6, 1 J, 1 L; 81/55, 56, 429, 57.11; 29/240

[56] References Cited

U.S. PATENT DOCUMENTS

| | | | |
|---|---|---|---|
| 938,113 | 10/1909 | Bocorselski | 408/127 |
| 1,881,728 | 10/1932 | Levedahl | 173/13 |
| 1,954,620 | 4/1934 | Connell | 173/13 X |
| 2,501,217 | 3/1950 | Hawn | 408/127 X |
| 2,789,597 | 4/1957 | La Torre | 81/55 |
| 3,331,269 | 7/1967 | Sauter | 81/56 X |
| 3,916,734 | 11/1975 | Sawan | 81/56 |
| 4,030,383 | 6/1977 | Wagner | 81/429 X |

Primary Examiner—Frederick R. Schmidt
Assistant Examiner—Steven P. Schad
Attorney, Agent, or Firm—I. Michael Bak-Boychuk

[57] ABSTRACT

A powered fastening tool described herein is useful to align and secure structural members to each other, the structural members having misaligned securing apertures. To accomodate this misalignment two eccentric bushings are nested and swaged together to be inserted into one of the misaligned apertures to be turned therein by the powered tool until an alignment is reached. The tool holds a fastener while concurrently rotating each eccentric bushing at an independent rate until hole alignment is achieved. At this point, the tool inserts the fastener through the hole in the lower structure and is then used to rotate the fastener into threaded engagement.

8 Claims, 34 Drawing Figures

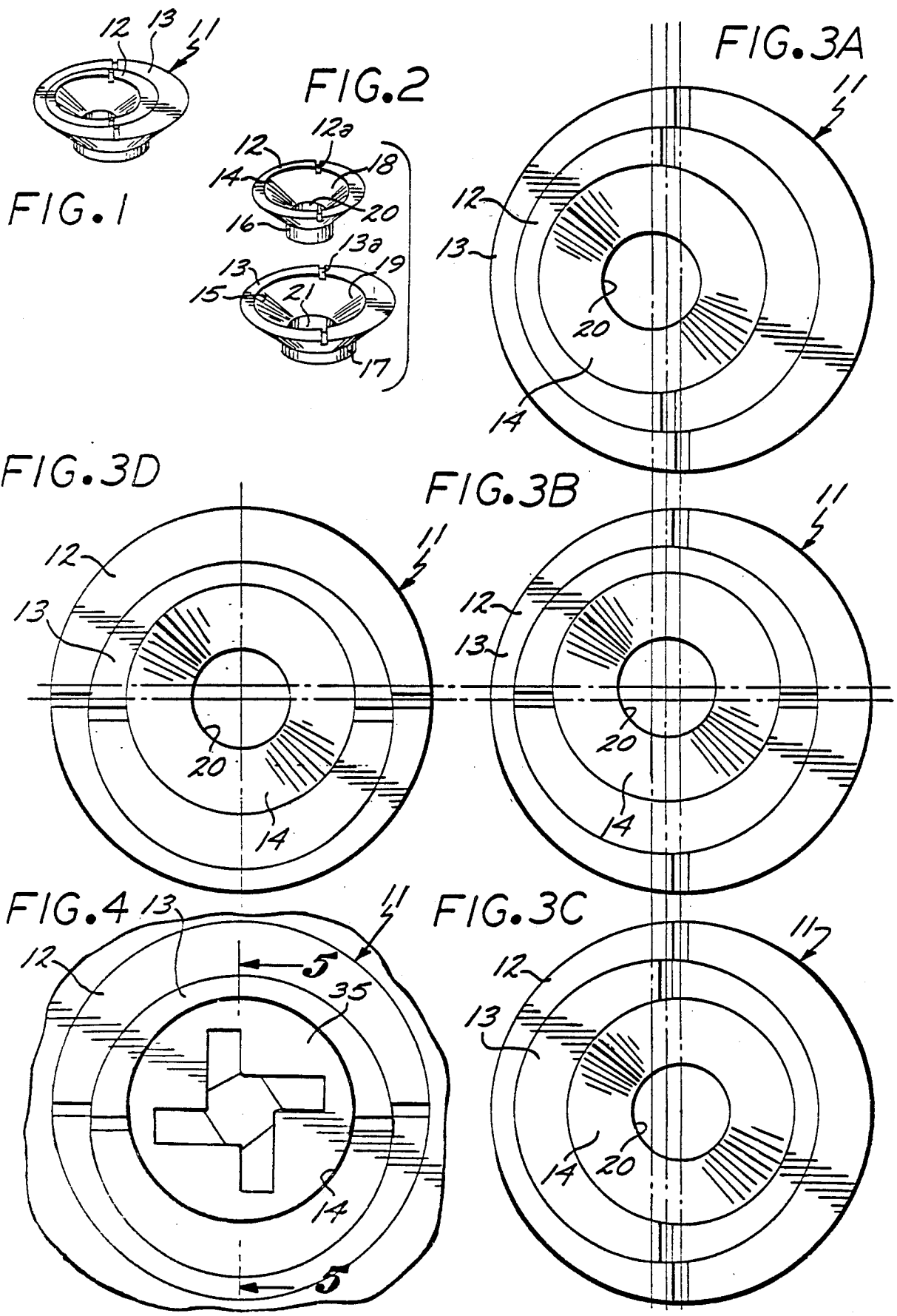

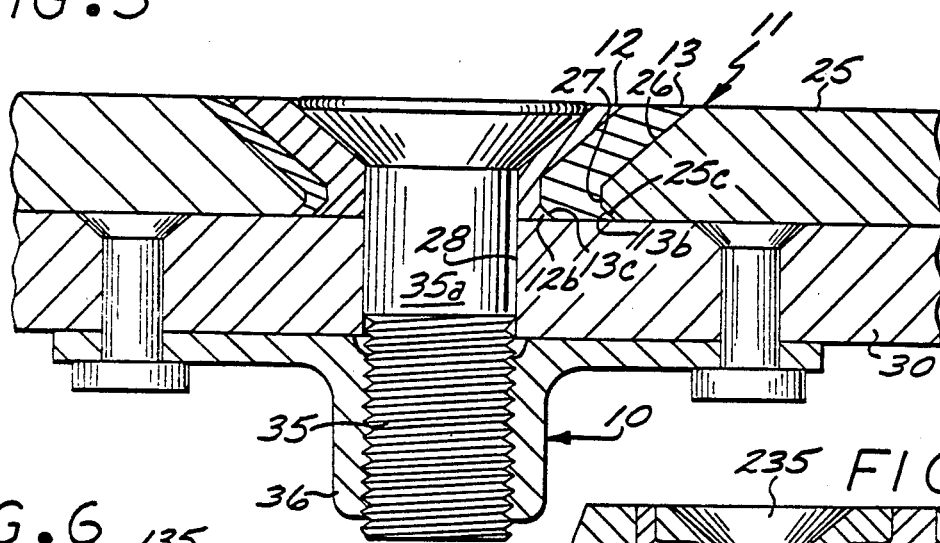
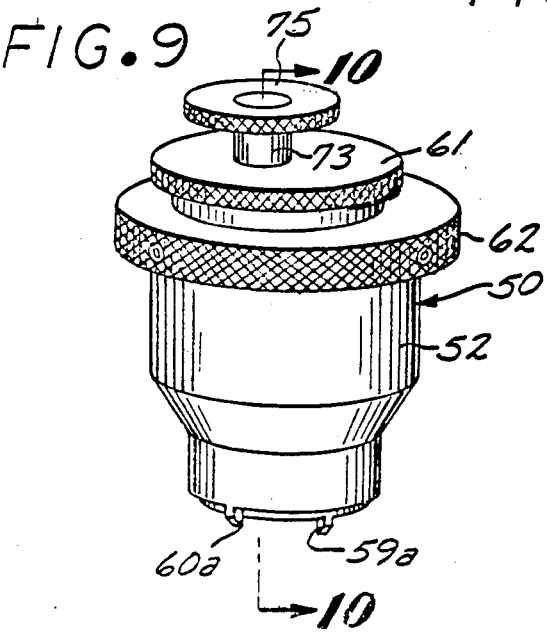
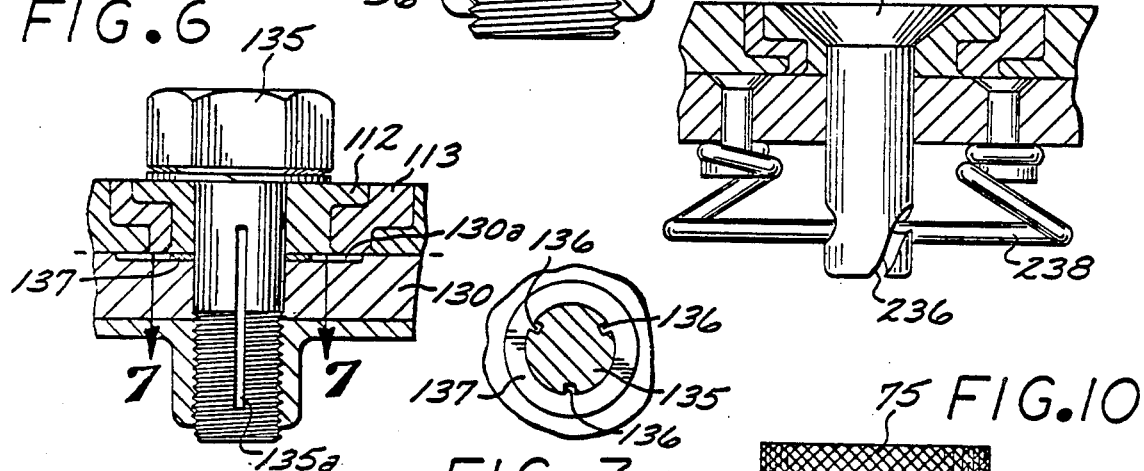
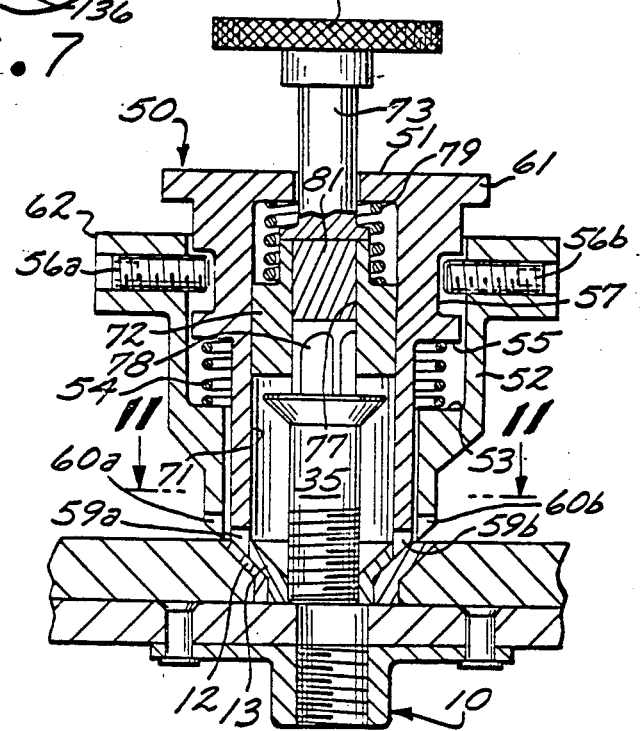

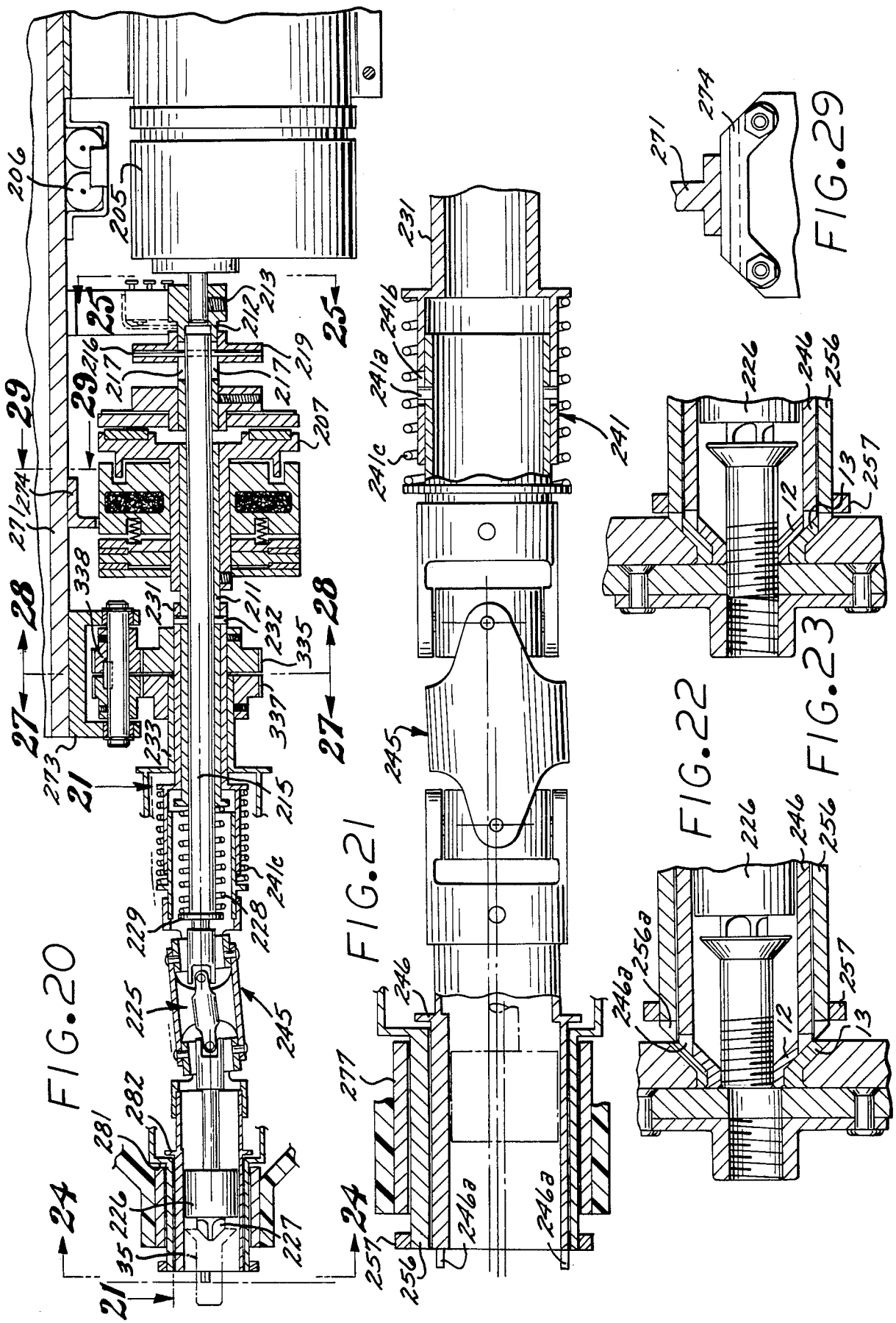

APPARATUS FOR FASTENING MISALIGNED STRUCTURAL MEMBERS

CROSS-REFERENCE TO RELATED APPLICATION

This application is a continuation-in-part of my pending application Ser. No. 88,612 entitled "Method and Apparatus for Fastening Misaligned Structural Members" filed Oct. 26, 1979 now U.S. Pat. No. 4,309,123 issued Jan. 5, 1982.

BACKGROUND OF THE INVENTION

1. Field of the Invention

The present invention relates to self-aligning fastening devices and means for installing same.

2. Description of the Prior Art

Since the advent of high performance commercial and military aircraft, the industry has faced the problem of providing rapid access to internally installed equipment for the purpose of inspection, service, maintenance and/or replacement. In doing this the nature of aircraft loads must be considered. The major loads imposed on the structure are those due to flight, landing and handling. In modern aircraft these are carried through the aircraft skin and, using the wing as an example, vary from low near the tip to high near the fuselage.

The constraints imposed on the designer include weight, cost, time and reliability. Historically, he has had to make a choice between two basic methods of handling the loads in the area of the cutout in the skin created by the need for internal access. He may elect to use a thin gauge non-stressed panel in conjunction with added internal structure designed and located to carry the primary bending loads around the cutout. This usually takes the form of a machined forging. The removable access panel is light since it carries only local air loads. Oversize holes may then be used in both the panel and the internal structure, together with a floating receptacle mounted on the internal structure. This design generally accepts misaligned holes and is usually used with a quick release type fastener. Tooling and labor costs for the panel installation are lower since only non-precision drill fixtures are required. A disadvantage to this method is the added cost and weight of the machined forging and the added weight it presents.

The alternate method is to use a load bearing access panel, usually of the same thickness as the surrounding skin, with close fitting fastener holes in both the panel and the adjacent structure which are connected with close tolerance fasteners. This technique provides the necessary bearing area and the intimate contact between all the load carrying members necessary to transfer the high shear and bending loads involved. This latter approach, on the other hand, requires master tooling, precision drill fixtures and a high degree of labor skill, while providing weight saving.

The costs of both types of panel installation are initially about the same. However, when considered in terms of the "Life Cycle Costing" system as used by the military in arriving at the total cost of the original acquisition and subsequent support and maintenance of an aircraft fleet over its expected life, the costs of the stressed access panel become exorbitant. This can easily be explained.

Experience has shown that minute shifting or working of the aircraft structure, when subjected to flight/landing/handling loads, very easily uses up the slight clearance between close fitting fasteners and holes. As an example, using a 0.25 inch diameter screw, the total diametral clearance is $$\frac{.0055}{.0005} \text{ inches.}$$

With fits like this, all too frequently when a panel is removed, the load is relieved and one or more of the fasteners cannot be replaced. The standard repair technique is then to drill the holes out to accept the next larger size fastener. This can usually be done only once for a given hole before running out of acceptable edge distance for the fastener. When this occurs, the usual remedy is to requisition a replacement panel, preferably a blank, and completing it on the spot to fit the structure. It is this condition that necessitates the procurement, storage and disbursement of a high number of spare access panels for the full life span of the aircraft fleet. It is readily apparent that this is not only expensive in terms of parts, storage facilities, labor and time, but also results in grounded aircraft, useless until they are repaired.

The present invention eliminates this basic problem by permitting the original design to accept mating holes in both the access panel and the internal structure that are grossly misaligned, either initially or through subsequent deformation, while retaining intimate contact between all load carrying members. This is rendered possible through the use of a powered tool which, in one sequence, drives the nested bushings to virtually all points of eccentric alignment.

SUMMARY OF THE INVENTION

Accordingly, it is the general purpose and object of the present invention to provide a power tool for driving a fastener assembly including nested eccentric bushings into mating alignment.

Other objects of the invention are to provide a power tool conformed to manipulate a plurality of eccentric parts to achieve alignment.

Yet further objects of the invention are to provide a portable power tool useful in field installation of close tolerance parts.

Briefly, these and other objects are accomplished within the present invention by providing a tool for turning a fastener assembly comprising two eccentric nested bushings each provided with a seat communicating with an eccentric bore. The seat of the exterior nested bushing is conformed to the exterior surface of the interior nested bushing, with the interior bushing including the fastener seat and a bore in eccentric disposition. Thus the rotation of the individual bushings of the nested set once inserted into the fastening hole will eventually achieve an alignment of the central bore which is coaxial with the opening in the structure to be attached to. At this point the inventive tool will advance the fastener into engagement while the turning of the bushings is stopped. To accommodate this individual rotation of the two nested bushings each bushing includes indexing slots on the exterior periphery thereof, the slot being exposed to be engaged by corresponding prongs on the tool conformed as two coencentric sleeves.

Received on the interior of the inner sleeve is an axially slidable driver extending from the rear end of the tool and terminating on the interior in a driving blade conformed to engage a fastener. During the course of installation, while the two eccentric bushings are still misaligned, the edges of the mating opening restrict the inward passage of the fastener. Once the two eccentric bushings are manipulated to align the fastener with the mating hole, the spring bias of the driver advances the fastener, concurrently disrupting the power connection to the sleeves. The driver alone is then advanced in rotation, driving the fastener home.

To provide the necessary coverage of all possible misalignments the inner and outer sleeves are driven at slightly differing rates. Thus for each point of eccentric alignment of the outer bushing all points of eccentricity of the inner bushing are exercised. In this manner eventual fastener insertion is insured which is then followed by threaded advance until the fastener is fully seated.

BRIEF DESCRIPTION OF THE DRAWINGS

FIG. 1 is a perspective illustration of a nested bushing assembly useful with the invention herein;

FIG. 2 is yet another perspective illustration of the nested bushing assembly shown in FIG. 1, illustrating the parts thereof in separated state;

FIGS. 3a-3d are top views of the nested flush-type bushing assembly illustrating the various alignments thereof;

FIG. 4 is yet another top view illustrating the alignment of the bushing assembly in receiving engagement with the fastener;

FIG. 5 is a side view in section taken along line 5—5 of FIG. 4;

FIG. 6 is yet another side view, in section, illustrating an alternative implementation of the bushings set out herein;

FIG. 7 is a top view, in section, taken along line 7—7 of FIG. 6;

FIG. 8 is a further embodiment of the self-aligning fastener disclosed herein illustrating the adaption thereof for one of various quick release attachments;

FIG. 9 is a perspective illustration of a manually operated installation tool useful with the invention herein;

FIG. 10 is a sectional view of the manual installation tool, taken along line 10—10 of FIG. 9;

FIG. 20 is a sectional view taken along line 20—20 of FIG. 18;

FIG. 21 is yet another sectional view taken along line 21—21 of FIG. 20;

FIG. 22 is a detail view of a fastener, in misalignment, engaged by the inventive power tool for insertion;

FIG. 23 is a detail view of the fastener shown in FIG. 22 subsequent to alignment by said tool;

FIG. 29 is a mounting detail taken along line 29—29 of FIG. 20;

DESCRIPTION OF THE PREFERRED EMBODIMENT

Figure 11:
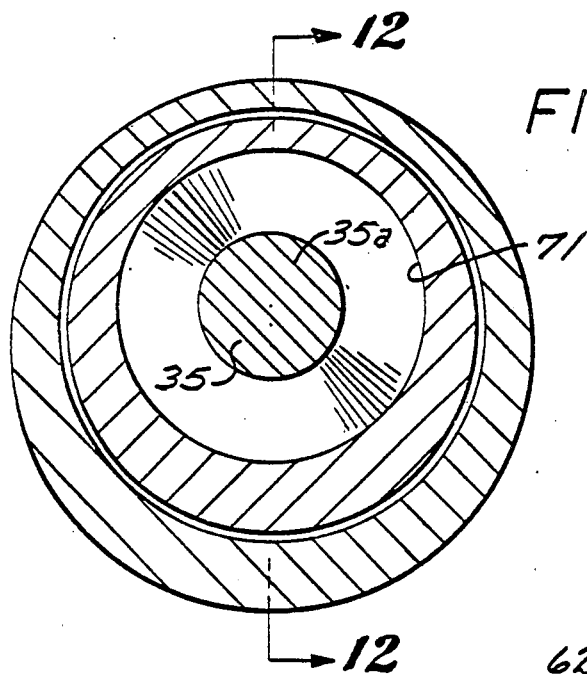
FIG. 11 is a top view, in section, taken along line 11—11 of FIG. 10.

As shown in FIGS. 1, 2 and 5, a self-aligning fastener arrangement, generally designated by the numeral 10, includes a set of nested bushings 11 comprising an interior bushing 12 and an exterior bushing 13. Bushings 12 and 13 are generally conformed to include conical segments, bushing 12 having a conical segment 14 and bushing 13 having a conical segment 15. Each of the conical segments end at the narrower end thereof in a cylindrical section shown herein as cylindrical sections 16 and 17 respectively. In the foregoing implementation the interior bushing 12 within the conical segment 14 includes an eccentrically aligned conical seat surface 18 terminating in an eccentric bore 20 extending through the cylindrical section 16. Thus the common axis extending through the conical seating surface 18 and the bore 20 is offset relative the central axis of the cylindrical segment 16 and the conical section 14. The exterior surfaces of the conical section 14 and the cylindrical section 16 are in turn received respectively in a conical seat surface 19 and a bore 21, once more, eccentrically formed within the exterior eccentric bushing 13. In order to maintain the nested bushings as an integral assembly the interior bushing 12 may include an extended lower exterior edge 12b swaged onto a corresponding chamfer 13c formed in bushing 13.

As shown in FIGS. 3a-3d, this eccentric arrangement allows for complete manipulation of the bore 20 relative to the alignment of the exterior eccentric bushing 13. Similarly, the alignment of the exterior eccentric bushing 13 within any plate 25 can be manipulated by the rotation of the eccentricity thereof, the combination of the eccentric manipulation of the interior bushing 12 and the exterior bushing 13 resulting in a full coverage of the tolerance ranges accommodated within the eccentric offsets. For this reason the attached plate 25 also includes a conical chamfer 26 formed around the exterior edge of a mounting hole 27. This mounting hole 27 may then be aligned over a hole 28 formed in the structure to which plates 25 is attached to, this structure being shown herein as a structural plate 30. A structural fastener, shown herein by way of a machine screw 35, may then be inserted into the interior of bore 20 and the opening 28 to attach or threadably engage a nut plate 36 or other retaining device on the other side of the structural support plate 30. Bushing 13, similar to bushing 12, may include an extended lower edge 13b which is swaged against a proximate chamfer 25c in plate 25. In this manner the nested bushings are retained in plate 25 in an arrangement which still permits the rotation thereof.

It is to be understood that for purposes of load transfer the opening 28 may be sized for mating fit with the shank 35a of the fastener 35, the load transfer into plate 25 being achieved by a conforming fit of the same fastener on the interior of the eccentric bushing 12. To align the eccentric interior of bushing 12 and concurrently the alignment of bushing 13 within the seating geometry in plate 25, each of the bushings includes indexed slots 12a and 13a, respectively, formed in the exposed surface thereof which may be engaged by an indexing installation tool according to the description following.

As shown in FIGS. 9–12, a manually operated tool assembly useful for aligning the foregoing eccentric nested bushings is generally designated by the numeral 50 and comprises two cylindrical sleeve-like structures set out herein as an inner sleeve assembly 51 and an outer sleeve assembly 52. Sleeve 52 is substantially annular in section and is conformed to receive on the interior thereof sleeve assembly 51. To provide for a spring bias, sleeve assembly 52 includes a reduced diameter section formed proximate the lower edge thereof which is achieved by way of a shoulder 53 supporting a spring 54. The other end of spring 54 abuts against an enlarged shoulder 55 formed on the interior sleeve assembly 51, and it is between these shoulders that an outwardly directed bias is achieved in the use of spring 54. The outward progression of sleeve assembly 51 out of the interior of sleeve assembly 52 is limited by way of several opposed set screws 56a and 56b which project into the annulus of the exterior sleeve assembly to extend into a peripheral groove 57 formed around the exterior of sleeve assembly 51. It is contemplated to form this peripheral groove 57 to a size sufficient to allow the telescoping translation of the inner sleeve assembly within the outer sleeve assembly such that the bottom edges thereof may be selectively extended. Formed on these bottom edges and more specifically on the bottom edge of sleeve assembly 51 are two spaced key projections 59a and 59b which are shaped to be received in the aforementioned indexing slot 12a on the upper surface of the inner eccentric bushing 12. Similarly the bottom edge of the sleeve assembly 52 is provided with two key projections 60a and 60b, once more conformed for insertion into the index slots 13a on the upper surface on the exterior eccentric bushing 13. In this form the installation tool assembly 50 may be placed over the exposed edges of the nested bushing assembly 11 and the individual sleeves may be respectively turned until engagement occurs between the key projections at the edges thereof and the respective indexing slots. This turning may be achieved by way of exposed mold strips 61 and 62 respectively formed around the exposed peripheries of sleeve assemblies 51 and 52. Formed on the interior of the sleeve assembly 51, furthermore, is an eccentrically aligned annular cavity 71 in which a plunger 72 is rotatably and slidably received. This plunger 72 is connected to a cylindrical handle 73 which extends to the exterior of the sleeve assembly 51 at the upper surface thereof. On the exterior, handle 73 connects to yet another knurled knob 75 through which the plunger may be turned. The plunger 72 includes a keyed receiving slot 77 on the inside thereof in which a magnet and a screw driver head or other turning tool 78 may be received. It is this turning tool that engages the normally found serrations at the top surface of the fastener 35 and it is by way of this tool that the fastener is engaged to the standard or quick release device. In order to assist the search for the alignment of the two nested bushings there is a spring bias provided by way of a spring 79 extending from the upper surface of plunger 72 and abutting the interior edge of the sleeve assembly 51. Thus, as the installation tool assembly 50 is first loaded with the fastener the fastener magnetically retained is then inserted into the eccentric bore 20 of the inner bushing 12. Spring 79 is then compressed, compressing the fastener against the off-set or misaligned edge of opening 28. The user indexes the inner and outer tool sleeves in the bushings by rotating each sleeve separately until they engage the indexing slots in the bushings and respectively turns both the exterior and the interior sleeve assemblies until the fastener, through the spring bias thus exerted, drops into the opening 28. At this point the knob 75 may be used to advance the fastener into engagement in the nut plate or other retaining device and the tool may be removed to be used in the next fastener opening. In each instance, blind or random manipulation of the two knurled edges on the sleeve assemblies will eventually achieve the necessary alignment of the bore 20 with the opening 28. Once so aligned, close tolerances can be maintained between the shank of the fastener 35 and the structure secured, thus permitting load transfer thereacross.

As shown in FIGS. 6 and 7 the foregoing structure may be variously modified to accommodate other fastening techniques. More specifically, as shown in FIG. 6, a bolt 135 may be similarly aligned by way of two nested bushings 112 and 113, bushings 112 and 113 in this instance entailing circular eccentric shoulders rather than conical surfaces. Bushings 112 and 113 may include swaged edges, similar to bushings 12 and 13, which retain the bushing assembly in the plate. Bolt 135 may be provided with longitudinal grooves 135a extending over a part of the shank thereof in which interiorly directed tabs 136 of a washer 137 are received. In this manner the fastener is also retained in the plate, precluding inadvertent loss. The structure 130 which receives this fastener may include a circular recess 130a which accommodates the foregoing washer 137 to allow for direct structural contact between the structure and the mounted plate. This same structural arrangement may be used, together with a chamfer on the interior of bushing 112 to align a quick release fastener as shown in FIG. 8. More specifically, as shown in this figure, a quick-release fastener 235 is provided with a spiral cam on the inserted end thereof, shown as groove 236, which is conformed to engage a spring or wire 238 extending on the underside of the secured plate.

The tool assembly 50 may be conveniently adapted to accommodate the foregoing alternative bushings and to operate on standard or special fastener ends by the simple expedient of selecting an appropriate bit insertable into the slot 77 therein. The foregoing tool assembly is further described according to the illustrations in FIGS. 11 and 12. In tight installation arrangements the eccentric tool sleeves may be required to keep the driver centered over the fastener as the fastener moves within the limits permitted by the nested bushings. In installation arrangements which allow for large exposed surfaces of the nested bushings, a fully concentric implementation of tool assembly 50 is possible since radial motion within slots 12a and 13a can occur. Thus assembly 50 may be eccentric or circular, depending on the size of the exposed slots and the strength of the tool material selected.

Figure 12:
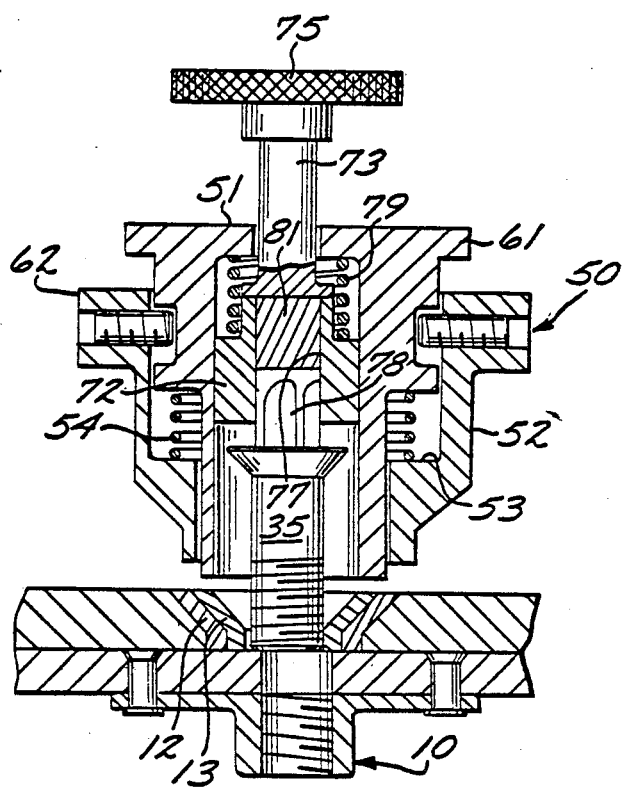
FIG. 12 is yet another side view, in section, of the installation tool, illustrating the disposition of a fastener before engaging alignment thereof.
Figure 13:
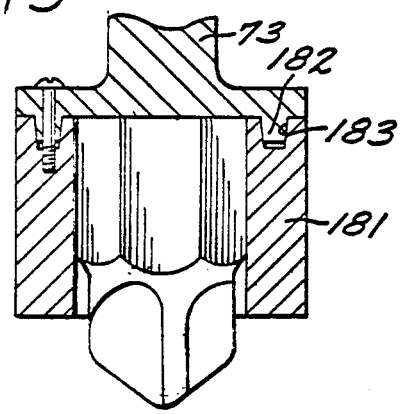
FIG. 13 is a detail view of yet another implementation of a tool bit retainer useful herein.

In the course of the foregoing description the means for retaining the driving tool have not been handled at length. While various fasteners may be installed pursuant to the foregoing description, magnetic retention of interchangeable driving bits is particularly useful. Thus as shown in FIGS. 10 and 12 a magnet 81 may be inserted into the interior of cavity 77 and it is this magnet that holds the bit in place. The same magnetic forces extend into the fastener, thus retaining the fastener for insertion. Alternatively, as shown in FIG. 13, cavity 77 may be formed by way of a magnetic skirt 181 fixed to the driver handle 73 made of a ferrous material by way of bare intimate contact between a circular bead 182 inserted in a groove 183. The magnetic skirt and the ferrous driver handle combine to form a magnetic loop which is completed through the tool bit. Since in each instance only small starting forces are applied to the fastener by the tool assembly 50, little torsional strength is required.

Figure 14:
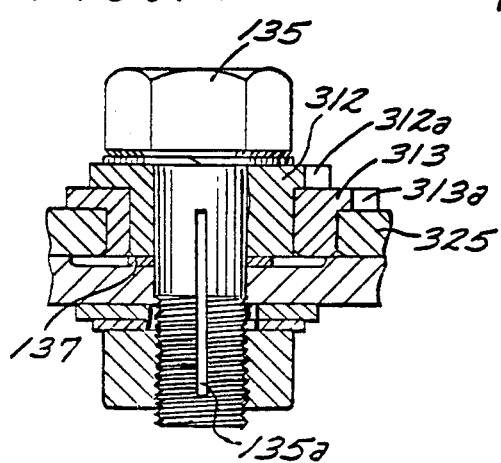
FIG. 14 is a side view, in detail, illustrating a further alternative implementation of a fastening arrangement according to the present invention.
Figure 15:
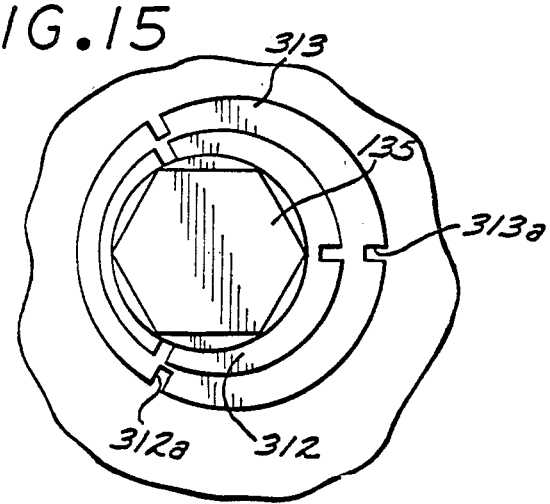
FIG. 15 is a top view of the implementation shown in FIG. 14.

In further alternative the structure shown in FIGS. 14 and 15 may be utilized. In this implementation two nested bushings 312 and 313 are swaged to each other and to a mounting plate 325. Each bushing is once more eccentric including a lateral flange provided with radial cutouts 312a and 313a which can be manipulated with any sharp tool like a screw driver or with the tool assembly 50, depending on the size selected. The fastener centered thereby may be constructed like that shown in FIGS. 6 and 7, rendering a convenient, self-engaged assembly.

The manipulation of the foregoing eccentric bushings may be further simplified and rendered convenient through the use of an inventive powered tool described in FIGS. 18-31. As shown in these figures the inventive power tool, generally designated by the numeral 200, comprises a substantially cylindrical housing 201 attached to a handle 202 which, in turn, is provided with a trigger 203 operating as a switch to complete the circuit across a power cord 204. Within the interior of housing 201 the cord connects to a motor 205 and, across a full wave rectifier 206, to an electromagnetic clutch assembly 207. Clutch assembly 207, when excited, engages a forward tubular axle 211 to a rear tubular axle 212 which, in turn, is clamped by a set screw 213 to the output of motor 205. Tubular axles 211 and 212 are aligned along a common axis and receive in the common interior thereof a shaft 215. Shaft 215 is pierced by a pin 216 at the rearward end thereof which extends through elongate slots 217 formed in the lateral surfaces of the axle 212. Thus shaft 215 is free to articulate within the axles to a stroke determined by the length of these slots.

On the exterior pin 216 engages a radially aligned disc 219 which thus moves along with the shaft. This disc 219 provides a rolling surface on which an end roller 221 rides, roller 221 being mounted on the end of a lever 222. It is this lever 222 that articulates a microswitch 223 whenever disc 219 is articulated by shaft 215.

Accordingly, linear displacement of the shaft 215 is accompanied by the opening of switch 223 which then shuts off the electromagnetic pull of clutch assembly 207.

The other, forward end of shaft 215 is connected to a double U-joint assembly 225 to allow for lateral misalignment, U-joint assembly 225 then driving a magnetized tool bit carrier 226 in which the appropriate tool bit 227 is received. This tool bit, in turn, is opposed by the fastener 35 which until alignment is opposed against inward progression into the bushings by the exposed surfaces attendant to misalignment. An appropriate spring bias for the shaft is provided by a spring 228 compressed between a radial flange 229 on shaft 215 and the forward end of the tubular axle 211. Axle 211, furthermore, is received in a tubular interior gear carrier 231 and fixed thereto by pins 232 which, in turn, is received within an exterior gear carrier 233. Gear carriers 231 and 233 respectively engage gears 335 and 337 which are meshed with a gear cluster 338 mounted for rotation adjacent thereto. By selecting an appropriate gearing ratio it is thus possible to drive carriers 231 and 233 at differential gearing ratios. Thus a small gear teeth differential in gears 335 and 337 will produce large turning ratios in their corresponding carriers. Carrier 231 extends to the forward side of carrier 233 to attach to a linear telescoping sliding assembly 241 transferring torque by pins 241a extending through slots 241b and biased for expansion by a spring 241c. The other end of the sliding assembly 241 is connected to a tubular U-joint assembly 245 which surrounds U-joint assembly 225 and which drives an indexing sleeve 246 extending through the forward end of housing 201. Sleeve 246 surrounds the bit carrier 226 and is provided at the exposed edge thereof with prongs 246a conformed to engage slots 12a formed in the exposed edge of the interior bushing 12. Accordingly, gear carrier 231 through assembly 241 drives sleeve 246 which rotates the interior bushing to various eccentric alignments within bushing 13.

In a similar manner gear carrier 233 connects across telescopic extension assembly 251 to a U-joint assembly 255 which drives an exterior sleeve 256 and the prongs 256a on the exposed edge thereof. Prongs 256a engage slots 13a in the exterior bushing 13 and thus will turn this bushing relative bushing 12 at a rate set by the gears 335, 337 and 338. The exposed edge of sleeve 256, furthermore, may be provided with a knurled flange 257 allowing for the manual retraction thereof for prong engagement.

Figure 16:
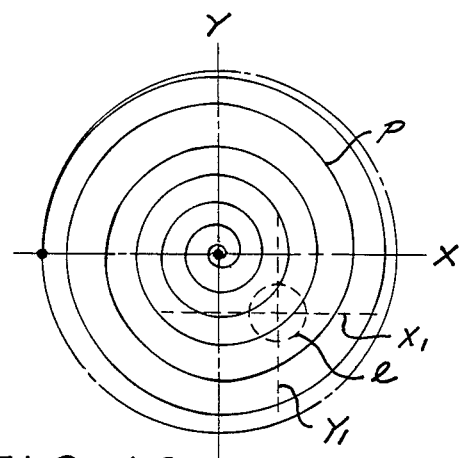
FIG. 16 is a top view diagram of the migration of the central bushing axis achieved by differential rates of rotation of the individual eccentric bushings.
Figure 17:
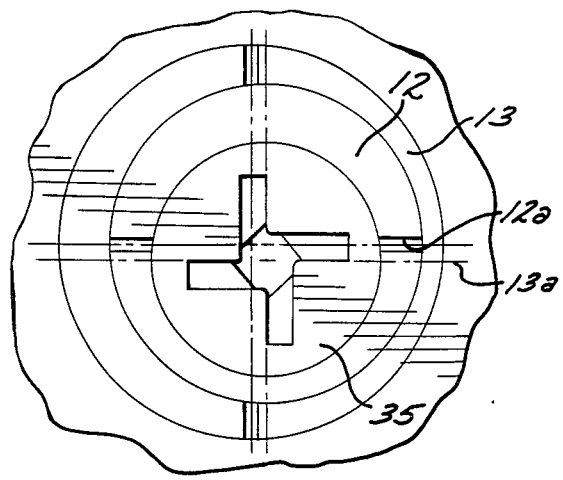
FIG. 17 is a top view of a fastener seated in the nested bushings disclosed herein.
Figure 18:
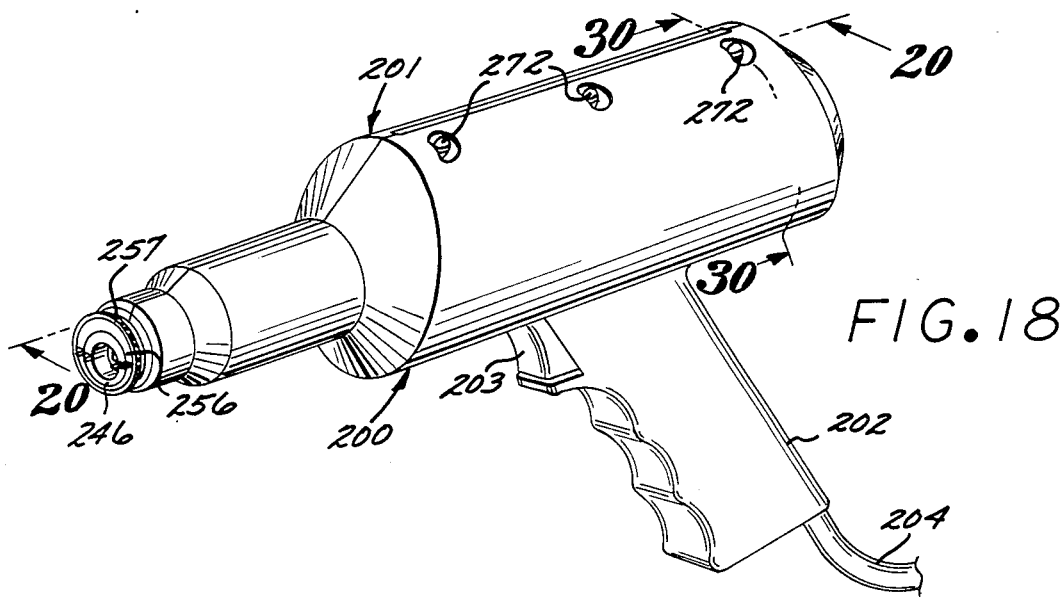
FIG. 18 is a perspective illustration of an inventive power tool set out herein.
Figure 19:
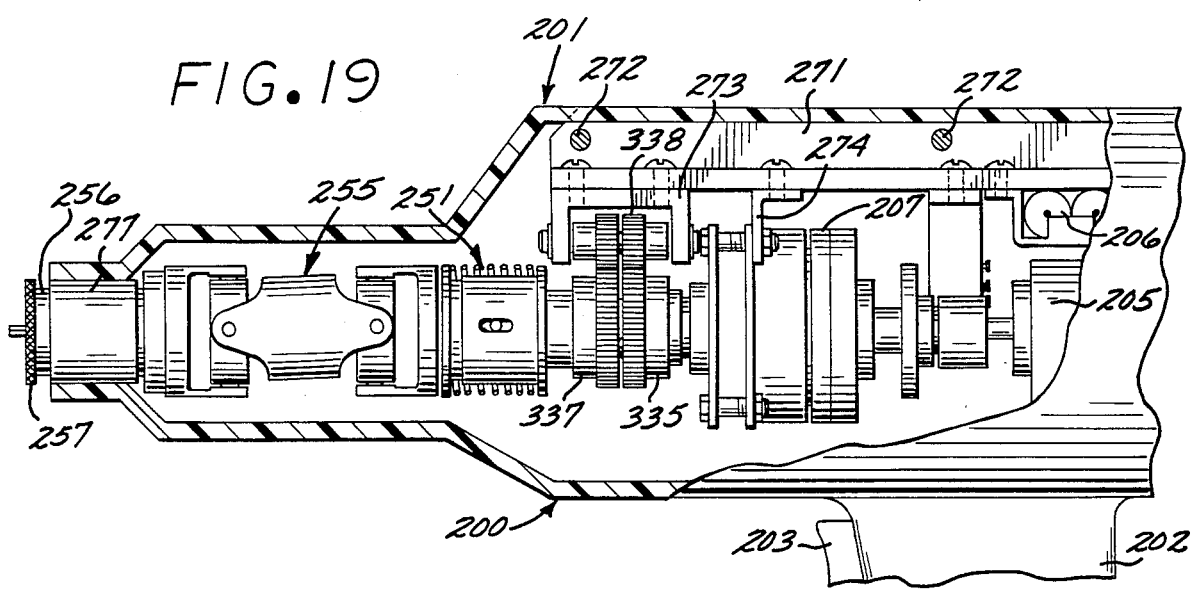
FIG. 19 is a sectional detail, in side view, of the tool shown in FIG. 18.
Figure 24:
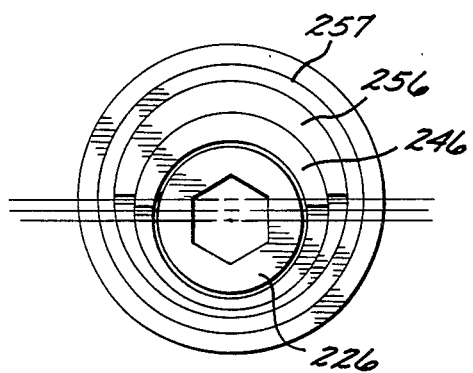
FIG. 24 is an end view of the inventive power tool taken along line 24—24 of FIG. 20.
Figures 25, 26:
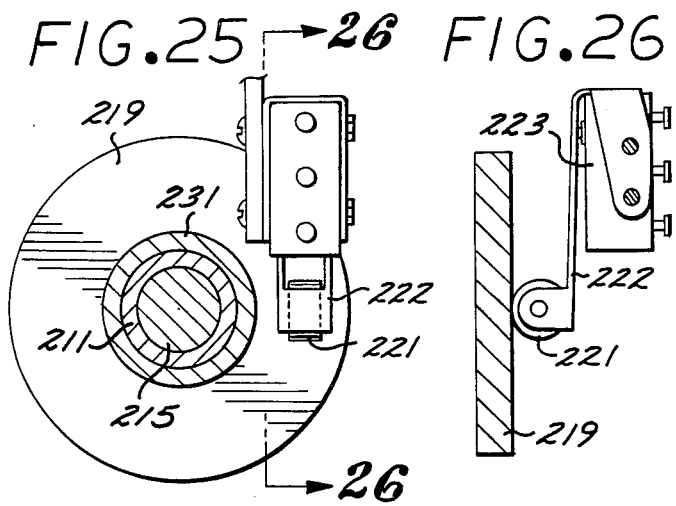
FIG. 25 is a sectional end view of a concentric sleeve arrangement incorporated in said power tool, taken along line 25—25 of FIG. 20.
FIG. 26 is a side view detail of a switching arrangement taken along line 26—26 of FIG. 25.
Figures 27, 28:
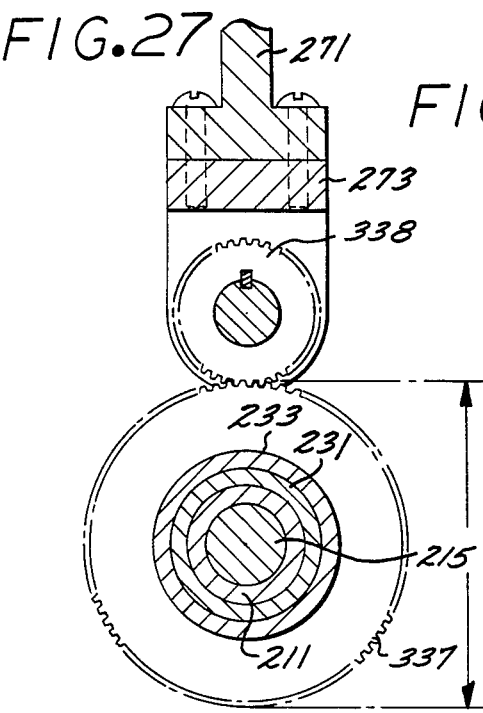
FIG. 27 is an end view section taken along line 27—27 of FIG. 20.
FIG. 28 is yet another end view detail taken along line 28—28 of FIG. 20.
Figure 30:
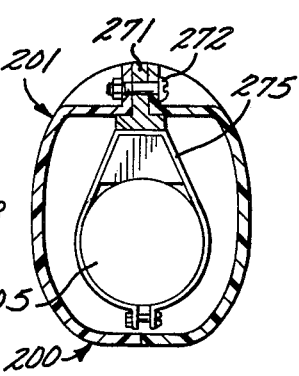
FIG. 30 is a detail view illustrating the mounting of an electrical motor as taken along line 30—30 of FIG. 18.
Figure 31:
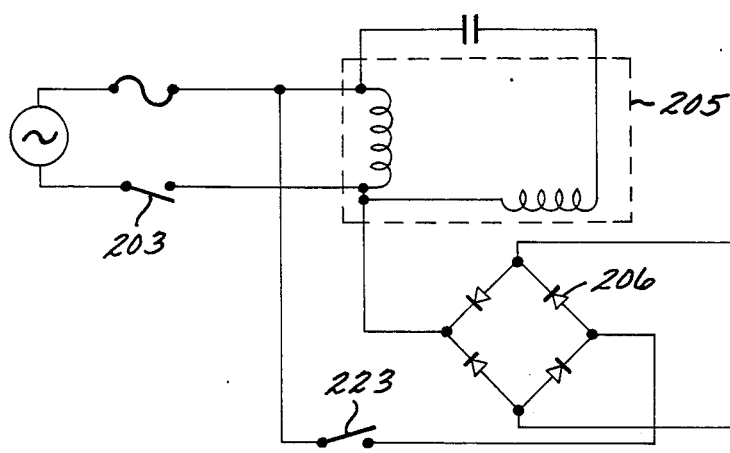
FIG. 31 is a circuit schematic of the electrical connection entailed in the inventive power tool.

It is to be understood that the U-joint assemblies 225, 245 and 255 accomodate the eccentric motions of the various fastener components as the tool is operated. As shown in FIG. 16 the relative eccentric motion of the center of the nested bushings, as they are turned, follows a spiral path P which upon a selected gearing ratio will be at a density sufficient to allow the fastener to drop at one point thereon. In FIG. 16 the coordinates XY of the fastener hole are shown to be at the exact center. Any other coordinates X1, Y1 resulting from misalignment will be similarly accommodated if such fall within a tolerance radius e of the path P. This radius e is the clearance between the fastener shank and the opening in the bushings. Thus a density in the turns of the path P which results in a separation less than the clearance e will allow fastener insertion in each instance. Once the fastener is inserted, per illustration in FIG. 17, the tapered seat and structural deformation will take out this clearance, resulting in an integral connection.

While the installation of the above described components may be variously implemented ease of assembly can be achieved by providing an elongate support member 271 supported in housing 201 by the various screws 272 holding the housing together. This member 271 then forms a spine from which a bracket 273 is suspended to align the gear cluster 338 adjacent gears 335 and 337. Similarly the clutch assembly 207 may be supported on a brace 274 once again suspended from member 271 and the motor 205 may be clamped by a strap 275 also tied to member 271.

These features provide the necessary alignment of the various components rearwards of the concentric U-joint assemblies. At the front housing 201 necks down to receive an insert 277 which acts as a guide for the sleeves 246 and 256 nested therein and also limits the outward progression of the sleeves by opposing a shoulder 281 around sleeve 256. Shoulder 281, in turn, opposes a flange 282 formed around the base of sleeve 246. In this form the bushings are automatically aligned and the fastener is brought home in one operation. The resulting connection then provides all of the benefits of a closely machined fitting without the attendant difficulty in installation.

By virtue of the above set out features the aircraft mechanic may adopt a sequence where the fastener is first placed onto the tip of the bit 227 and the knurled flange 257 is manually pulled back to expose the inner prongs. The inner prongs are then inserted into the slots 12a while the fastener is inserted into the bushings. At this point the flange 257 is released and power is applied by depressing trigger 203 until the outer prongs engage their slots. By maintaining forward pressure on the tool the rotary progression of sleeve 256 eventually achieves engagement with bushing 13 and the bushings are then rotated at the geared rates until the fastener enters its hole. At this point clutch 207 is deenergized, now acting as a brake, to stop all further rotation of the sleeves while the fastener is brought home.

Thus in one operation one may now accomplish a technique which heretofore has been difficult if not impossible.

Obviously many modifications and changes may be made to the foregoing description without departing from the spirit of the invention. It is therefore intended that the scope of the invention be determined solely on the claims appended hereto.

What is claimed is:

1. A power tool for aligning eccentric nested bushings over a fastener opening and advancing a fastener into the common interior thereof, comprising:
    a motor provided with a rotary output shaft;
    a drive shaft operatively connected at one end to said output shaft for common rotation therewith;
    a first tubular carrier concentrically aligned over said drive shaft;
    clutch means deployed between said output shaft and said first tubular carrier for selective engagement thereof;
    a second tubular carrier concentrically mounted over a portion of said first tubular carrier;
    gearing means connected between said first and second tubular carrier;
    a fastener driver operatively connected to the other end of said drive shaft; and
    a first and second bushing driver concentrically mounted around said fastener driver and respectively connected for common rotation with said first and second carrier for engaging respective ones of said bushings for advancement thereof in rotation.
2. Apparatus according to claim 1 wherein:
    said clutch means comprises an electromagnetic clutch.
3. Apparatus according to claim 2 further comprising:
    said drive shaft including sliding means for axial articulation thereof upon the insertion of said fastener into said fastener opening; and
    switch means connected to said electromagnetic clutch and operated by said sliding means for disabling said clutch upon the sliding articulation of said drive shaft.
4. Apparatus according to claim 3 wherein:
    said drive shaft and first and second bushing drivers each include flexible joints for lateral displacement thereof.
5. Apparatus according to claim 1 wherein:
    said motor is an electric motor provided with a manual switch for selective excitation thereof.
6. Apparatus according to claim 1 wherein:
    said first and second bushing drivers include spring loaded extension links for axial displacement thereof.
7. Apparatus according to claim 1 wherein:
    said nested bushings include transverse slots on the exterior peripheries thereof and said bushing drivers include prongs conformed to engage said slots.
8. Apparatus according to claim 1 wherein:
    said drive shaft includes magnetic retention means for retaining said driver therein.

* * * * *